United States Patent Office 2,752,008
Patented June 26, 1956

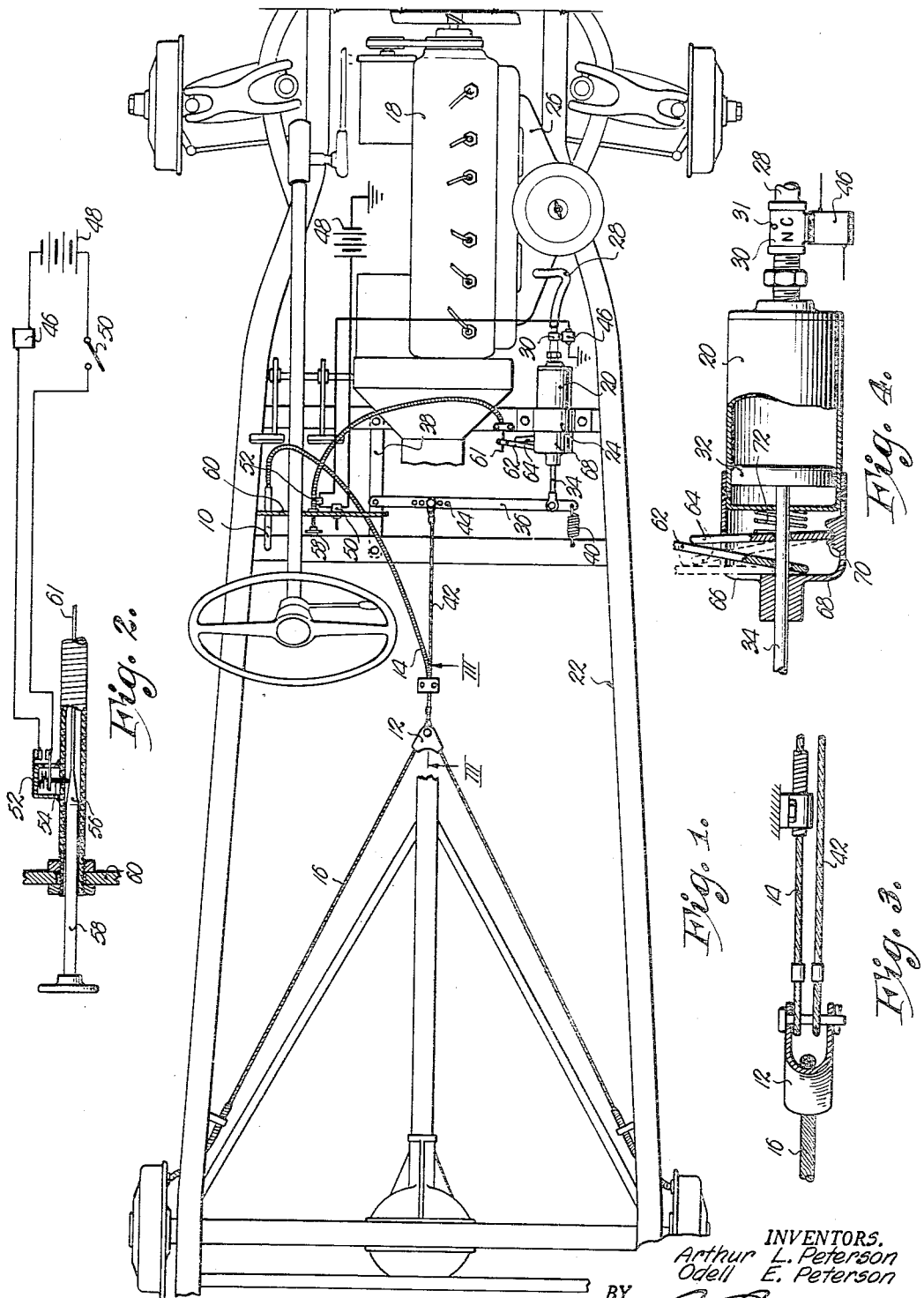

2,752,008

VACUUM OPERATED HAND BRAKE UNIT FOR VEHICLES

Arthur L. Peterson, Lee's Summit, and Odell E. Peterson, Kansas City, Mo.

Application September 10, 1953, Serial No. 379,354

6 Claims. (Cl. 188—152)

This invention relates to improvements in automotive vehicles and more particularly to the provision of a power hand brake operating mechanism, the primary object being to provide structure of such nature that it may be placed in use as desired without affecting the normal operation of the usual hand brake.

For the most part, hand brakes of automobiles are somewhat difficult to apply and release, particularly by women. If the same are to safely hold and prevent rolling movement of the vehicle, considerable force is required to release the hand brake if it is properly set sufficiently tight to function as intended. Structure has heretofore been suggested for rendering the operation semi-automatic, but for the most part the same have been complicated and expensive, and more important, have been formed in a manner to interfere with the normal operation of the conventional hand brake lever now a part of the automobile as standard equipment.

It is a most important object of the present invention, therefore, to provide a vacuum operated hand brake unit for vehicles that includes pneumatic means operably coupled with the intake manifold of the engine so as to permit setting of the brakes merely by actuating a pull-rod to place the pneumatic assembly into use.

Another important object hereof is to provide a vacuum unit of the aforementioned character that includes holding means to maintain the brakes set and which is automatically released simultaneously with the closing of the vacuum line between the engine and the vacuum cylinder-piston unit.

Other objects relate to important details of construction, all of which will be made clear as the following specification progresses.

In the drawing:

Figure 1 is a fragmentary top plan view of an automobile chassis showing a vacuum operated hand brake unit therefor made pursuant to our present invention;

Fig. 2 is a view partially schematic and illustrating the manual control rod of the vacuum unit hereof together with its associated switch;

Fig. 3 is an enlarged fragmentary detailed cross-sectional view taken on line III—III of Fig. 1; and Fig. 4 is an enlarged fragmentary elevational view of the vacuum cylinder and piston, parts being broken away to reveal details of construction.

Modern day automobiles are conventionally provided with hydraulic brakes operated through the foot pedal so as to apply hydraulic pressure by means of a master cylinder and a wheel cylinder for each brake respectively. Additionally, the two rear brakes may be operated manually through a hand lever 10 coupled with a yoke or the like 12 by means of a flexible cable 14. The yoke 12 or other connecting means may be joined with the rear brakes in any suitable manner and for purposes of illustration there is shown a cable 16 threaded through the yoke 12 as shown in Figs. 1 and 3 and operably connected to the two rear brakes. Manifestly, reciprocable movement of the yoke 12 longitudinally of the automobile and toward the engine 18 thereof sets the rear brakes when the lever 10 is actuated.

The vacuum operated hand brake unit hereof has no effect upon the use of the brake structure just described and the latter may be employed in the normal way if desired. Pneumatic means in the nature of a vacuum cylinder 20 is suitably mounted to the chassis 22 or framework of the automobile by means of a bracket 24. Cylinder 20 has connection with the intake manifold 26 of the engine 18 to provide a source of suction for the cylinder 20 by means of a pipe or conduit 28 within which is interposed a normally closed shut-off valve 30.

A horizontally reciprocable piston 32 within the cylinder 20 has a stem 34 pivotally joined to a cross-arm 36 near one end of the latter. Arm 36 is in turn swingably mounted on a bar 38 attached to the chassis 22 and a spring 40 yieldably biases the arm 36 toward the rearmost end of the automobile. Arm 36 is connected directly with the yoke 12 by a short cable 42 and a plurality of openings 44 in the arm 36 permit adjustment of the cable 42 therealong so as to provide proper leverage.

The valve 30 is electrically operated through the medium of a solenoid 46 coupled with battery 48 of the automobile through the ignition circuit so that the ignition switch 50 must be closed before the brakes can be set. However, it is to be pointed out that the engine 18 need not be operating nor the switch 50 closed to release the brakes, as will hereinafter become clear. After closing of switch 50, solenoid 46 may be energized to open the valve 30 by closing a switch 52 within the solenoid circuit and to this end there is provided a spring-loaded plunger 54 for the switch 52 that is depressed by beveled end 56 of plunger rod 58 when the latter is pushed inwardly.

The plunger rod 58 is conveniently located on the dashboard 60 of the automobile and has a flexible cable 61 attached thereto and operably coupled with a holding latch for the piston stem 34. Such latching means includes a pair of bars 62 and 64 extending through a slot 66 in a cap 68 for the cylinder 20. Each of the bars 62 and 64 is loosely threaded on the stem 34 within the cap 68, bar 62 having direct connection with the flexible cable 61 as shown in Fig. 1. The bar 64 is interposed between the bar 62 and the proximal end of cylinder 20 and is fulcrumed in cap 68 on a V-shaped embossment 70. A spring 72 yieldably biases the bar 64 against the bar 62.

Solenoid 46 is de-energized and the valve 30 is closed when the plunger 58 is retracted and the switch 52 is open as shown in Fig. 2. In such normal condition the bar 62 is also swung to the full line position shown in Fig. 4 by the force of cable 61 to compress the spring 72 and to hold the bar 64 in an unlocked position with respect to the stem 34.

In the event it is desired to set the brakes through use of the vacuum unit hereof, switch 50 is closed and the engine 18 is started. Thereupon the operator merely depresses the plunger 58 to close the switch 52 which energizes solenoid 46, opens the valve 30, and closes an air port 31 in valve 30. This places cylinder 20 in communication with the source of vacuum from engine 18 through manifold 26 and such suction draws upon the piston 32 to shift the same from the position shown in Fig. 4 toward conduit 28 against the action of spring 40. Swinging of the arm 36 toward the engine 18 pulls upon the cables 42 and 16 to set the brakes.

The inward movement of plunger 58 also releases the bar 64 by virtue of the bar 62 moving to the dotted line position shown in Fig. 4. While the stem 34 is free to move inwardly notwithstanding the release of bar 62, it is held against outward movement through the action of spring 72 forcing the bar 64 against the bar 62 as shown in dotted lines in Fig. 4 and causing the bar 64 to grip the stem 34.

The brakes will remain so set because of the action of the latch or lock 64, notwithstanding the opening of switch 50, stopping of the engine 18 and opening of solenoid 46, which closes the valve 30 and opens port 31 to admit air to cylinder 20. At any time, therefore, the brakes may be released without closing switch 50 or starting the engine 18 since the operator need merely pull upon the plunger 58 to release the latch 64 by the operation of bar 62. Spring 40 will retract the piston 32 and arm 36 will swing to the normal position shown in Fig. 1.

Such release may also take place with switch 50 closed and engine 18 operating since depression of plunger 58 not only releases the latch 64 but opens the switch 52 to de-energize solenoid 46, closing valve 30 and opening port 31, thereby cutting off the suction that moves the piston 32 toward the conduit 28. As previously mentioned, port 31 vents cylinder 20 to atmosphere only when valve 30 is closed. Thus, when valve 30 is closed, the vacuum in cylinder 20 is lost and spring 40 will move piston 32 to the left, viewing Fig. 4, after release of bar 64.

Having thus described the invention what is claimed as new and desired to be secured by Letters Patent is:

1. In an automobile having an engine, a pair of rear wheels, each provided with a brake, an actuating cable for said brakes having a yoke, and a hand lever provided with a cable attached to said yoke, a vacuum operated unit for actuating said brakes separately from said lever, said unit including a vacuum cylinder; a conduit coupling the cylinder with the intake manifold of said engine to provide a suction for the cylinder when the engine is operating; a control valve in said conduit; a piston reciprocable in the cylinder and provided with a stem; means operably connecting the stem with said yoke; structure for opening said valve to admit suction to the cylinder and thereby shift the piston to one end of its path of travel, said structure including a manually reciprocable plunger; a latch engageable with said stem for holding the piston at said one end of its path of travel when the plunger has been reciprocated to open said valve; and means coupling the plunger and said latch for releasing the latter upon retraction of the plunger.

2. In an automobile having an engine, a pair of rear wheels, each provided with a brake, an actuating cable for said brakes having a yoke, and a hand lever provided with a cable attached to said yoke, a vacuum operated unit for actuating said brakes separately from said lever, said unit including a vacuum cylinder; a conduit coupling the cylinder with the intake manifold of said engine to provide a suction for the cylinder when the engine is operating; a control valve in said conduit; a piston reciprocable in the cylinder and provided with a stem; means operably connecting the stem with said yoke; an electrical device for opening said valve to admit suction to the cylinder and thereby shift the piston to one end of its path of travel; a manually reciprocable plunger; a switch coupled with said device for energizing the latter and having means thereon within the path of travel of the plunger for closing the switch upon reciprocation of the plunger; a latch engageable with the stem for holding the piston at said one end of its path of travel; and means coupling the plunger with said latch for releasing the latter upon retraction of the plunger.

3. In a vacuum operated unit as set forth in claim 2 wherein said latch is provided with an opening receiving said stem and is pivotally mounted at one end thereof for swinging movement to and from a position engaging said stem within the opening.

4. In a vacuum operated unit as set forth in claim 3 wherein said coupling means includes a length of flexible cable operably interconnecting said plunger and the latch, the latter being swingable away from said position upon retraction of the plunger.

5. In a vacuum operated unit as set forth in claim 4 wherein is provided spring means on the stem engaging the latch and biasing the latter toward said position.

6. In a vacuum operated unit as set forth in claim 2 wherein is provided a port in said conduit adjacent the valve and venting the cylinder to atmosphere when the valve is closed.

References Cited in the file of this patent

UNITED STATES PATENTS

| | | |
|---|---|---|
| 1,627,509 | Hoffman | May 3, 1927 |
| 2,079,252 | Healy | May 4, 1937 |
| 2,102,461 | Howell et al. | Dec. 14, 1937 |
| 2,127,890 | Sills et al. | Aug. 23, 1938 |
| 2,156,290 | Hubbell | May 2, 1939 |
| 2,669,329 | Price | Feb. 16, 1954 |